(12) United States Patent
Uchida

(10) Patent No.: US 6,374,080 B2
(45) Date of Patent: Apr. 16, 2002

(54) MOBILE COMMUNICATION SYSTEM

(75) Inventor: Yoshinori Uchida, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/754,108

(22) Filed: Jan. 5, 2001

Related U.S. Application Data

(63) Continuation of application No. PCT/JP99/03239, filed on Jun. 17, 1999.

(51) Int. Cl.[7] .......................... H04B 7/185; H04B 7/01; H04Q 7/20

(52) U.S. Cl. ...................... 455/13.1; 455/502; 455/67.6; 455/426; 455/552; 455/448; 455/440; 455/12.1

(58) Field of Search .............................. 455/12.1, 13.1, 455/13.2, 13.4, 11.1, 427, 428, 430, 15, 60.502, 552, 553, 426, 432, 435, 436, 448, 440, 444, 517; 370/519; 375/267, 354

(56) References Cited

U.S. PATENT DOCUMENTS

| | | | | |
|---|---|---|---|---|
| 5,239,671 A | * | 8/1993 | Linquist et al. | 455/13.1 |
| 5,950,127 A | * | 9/1999 | Nitta et al. | 455/426 |
| 6,181,952 B1 | * | 1/2001 | Murata | 455/552 |
| 6,256,497 B1 | * | 7/2001 | Chambers | 455/432 X |

FOREIGN PATENT DOCUMENTS

| | | |
|---|---|---|
| JP | 58-131842 | 8/1983 |
| JP | 59-6642 | 1/1984 |
| JP | 5-130001 | 5/1993 |
| JP | 6-338849 | 12/1994 |
| JP | 7-75344 | 8/1995 |

OTHER PUBLICATIONS

Radiocommunication Study Groups, Doc. 4–9S/TEMP/30(Rev.1)–E, Inter. Telecommunications Union, Jan. 13, 1997, pp. 1–25.

Hase, Yoshihiro, et al., "A Novel Broadband Access Network Using Stratospheric Wireless Communication Platforms", Technical Report of IEICE, SST97–93, Sep. 1997, pp. 75–80, Tokyo, Japan.

* cited by examiner

Primary Examiner—Tracy Legree
(74) Attorney, Agent, or Firm—Rothwell, Figg, Ernst & Manbeck

(57) ABSTRACT

In cases where a radio communication is performed between a ground radio base station and a subscriber station, when a delay time J passes after the transmission of a radio wave from the ground radio base station to a stratospheric platform base station, another radio wave relating to the same information as that indicated by the radio wave is transmitted from the ground radio base station to the subscriber station. Therefore, in the subscriber station, a phase of the radio wave directly transmitted from the ground radio base station is synchronized with a phase of the radio wave transmitted from the ground radio base station through the stratospheric platform base station. Accordingly, the subscriber station can change over from one radio wave, of which the strength is weakened, to another radio wave.

15 Claims, 10 Drawing Sheets

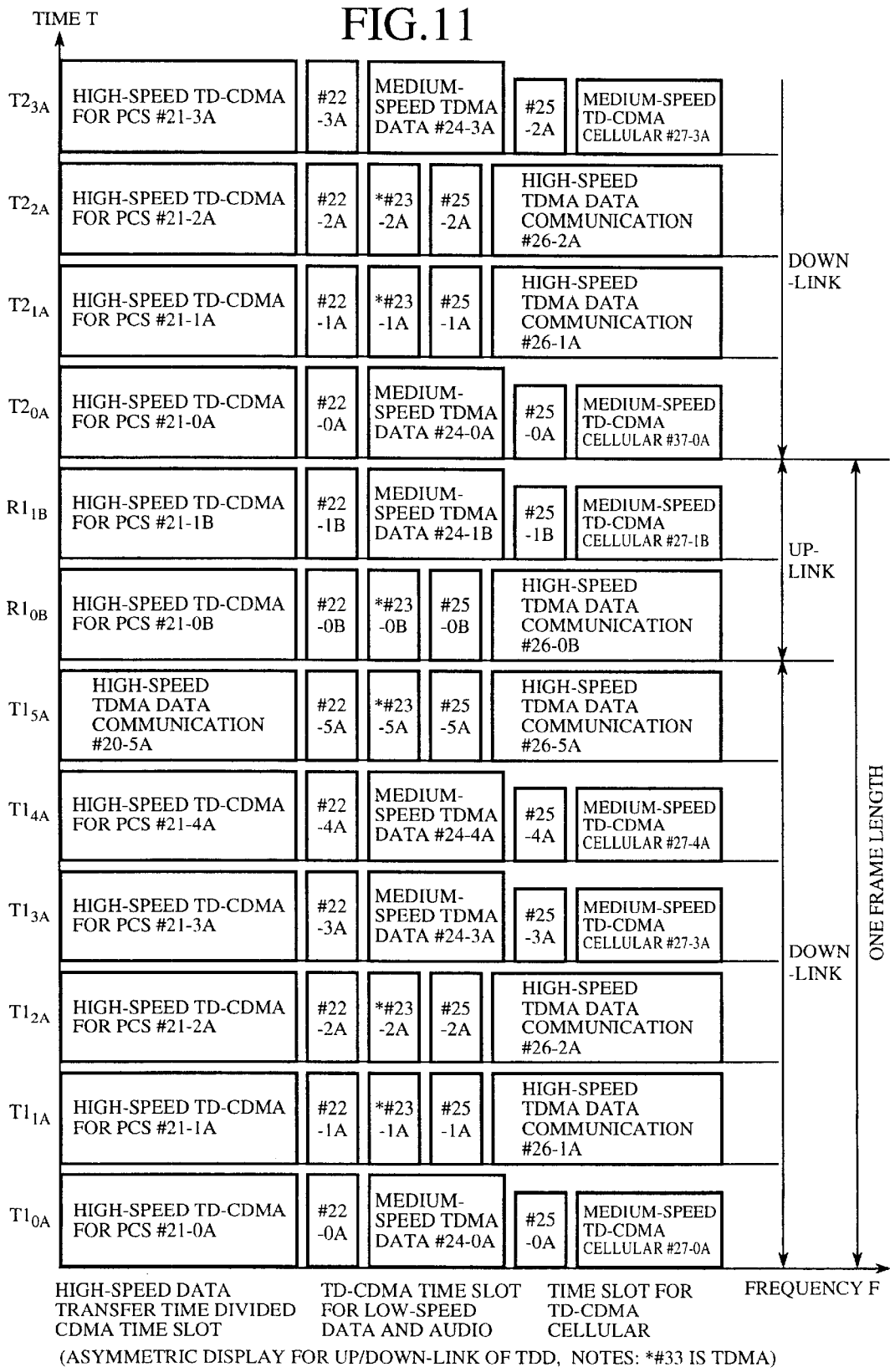

MOBILE COMMUNICATION SYSTEM

CROSS-REFERENCE TO THE RELATED APPLICATION

This application is a continuation of International Application No. PCT/JP99/03239, whose International filing date is Jun. 17, 1999, the disclosures of which Application are incorporated by reference herein. The present application has not been published in English.

BACKGROUND OF THE INVENTION

1. Field of the Invention

The present invention relates to a mobile communication system in which radio communication is performed between a ground radio base station and a subscriber station (for example, a fixed radio station, a semi-fixed radio station, a mobile station, a portable radio station and so on) by using a Time Division Multiple Access (TDMA) method, a Code Division Multiple Access/Time Division Duplex (CDMA/TDD) method or a Time Divided CDMA method.

2. Description of Related Art

In a mobile communication system, communication of information is, for example, performed between a mobile station such as a mobile on-vehicle communication apparatus or a mobile portable communication apparatus and a ground radio base station through a radio channel.

A technique, in which a satellite is added to the mobile communication system to make the satellite function as a relay repeater, has been disclosed in the patent gazette: Publication of the Japanese Application No. H7-75344 of 1995, the Published Unexamined Japanese Patent Application No. S58-131842 of 1983, the Published Unexamined Japanese Patent Application No. S59-6642 of 1984 and the Published Unexamined Japanese Patent Application No. H5-130001 of 1993.

However, the satellite functions only as a relay repeater, but the satellite has no function for adjusting the phase of a radio wave transmitted and received.

Because the conventional mobile communication system has the above described configuration, a satellite can be used as a relay repeater. However, because the satellite has no function for adjusting a phase of radio wave, a phase shift between a radio wave directly transmitted from a ground radio base station and a radio wave transmitted from the ground radio base station through the satellite is generated in a subscriber station. Therefore, even though a power of one of the radio waves is weakened, there is a problem that it is difficult to hand over the other radio wave to the subscriber station.

SUMMARY OF THE INVENTION

The present invention is provided to solve the above problems, and has an object of providing a mobile communication system which can be used in cases where the radio waves are received in a subscriber station. At the same time, the present invention allows while changing over from either one of a radio wave directly transmitted from a ground radio base station and a radio wave transmitted from the ground radio base station through a satellite (a stratospheric platform base station) to the other in response to conditions of the radio waves.

In a mobile communication system according to the present invention, when a prescribed delay time passes after the transmission of a radio wave to a stratospheric platform base station, another radio wave relating to the same information as that indicated by the radio wave is transmitted to a subscriber station.

Therefore, a phase of a radio wave directly transmitted from a ground radio base station can be synchronized with a phase of a radio wave transmitted from the ground radio base station through the stratospheric platform base station. Accordingly, when one of the radio waves becomes weakened, it is possible to hand over the other radio wave to the subscriber station.

In a mobile communication system according to the present invention, the subscriber station compares a phase of the radio wave transmitted from the ground radio base station with a phase of the radio wave transmitted from the stratospheric platform base station, the subscriber station transmits phase difference information, the ground radio base station receives the phase difference information from the subscriber station, and the ground radio base station adjusts the prescribed delay time.

Therefore, the phase synchronization can be precisely performed, and communication turbulence in a hand-over operation can be suppressed.

In a mobile communication system according to the present invention, the subscriber station has a plurality of phase detectors for respectively detecting phase difference information and transmits the pieces of phase difference information to a plurality of ground radio base stations.

Therefore, even though the subscriber station moves to a zone of an adjacent ground radio base station during the communication, communication turbulence can be suppressed.

In a mobile communication system according to the present invention, the subscriber station transmits the phase difference information in which one symbol length is a minimum unit.

Therefore, the phase synchronization can be performed more minutely.

In a mobile communication system according to the present invention, the subscriber station transmits the phase difference information in which one chip rate length is a minimum unit.

Therefore, the phase synchronization can be performed more minutely.

In a mobile communication system according to the present invention, the ground radio base station compares a phase of the radio wave transmitted from the stratospheric platform base station with a phase of the radio wave transmitted to the subscriber station and adjusts the prescribed delay time according to a comparison result.

Therefore, the phase synchronization can be precisely performed, and communication turbulence in a hand-over operation can be suppressed.

Also, the phase synchronization can be performed more minutely.

In a mobile communication system according to the present invention, the ground radio base station adjusts the prescribed delay time according to the comparison result in which one symbol length is a minimum unit.

Therefore, the phase synchronization can be performed more minutely.

In a mobile communication system according to the present invention, the ground radio base station adjusts the prescribed delay time according to the comparison result in which one chip rate length is a minimum unit.

Therefore, the phase synchronization can be performed more minutely.

In a mobile communication system according to the present invention, the stratospheric platform base station receives the radio wave transmitted from the ground radio base station, measures a frame length of the radio wave, compares the frame length with a standard frame length and adjusts a delay time extending from the reception of the radio wave to the transferring of the radio wave according to a comparison result.

Therefore, even though the stratospheric platform base station is moved by an air flow, phase synchronization can be performed.

In a mobile communication system according to the present invention, the stratospheric platform base station receives the radio wave transmitted from the ground radio base station, measures a multi-frame length of the radio wave, compares the multi-frame length with a standard multi-frame length and adjusts a delay time extending from the reception of the radio wave to the transferring of the radio wave according to a comparison result.

Therefore, even though the stratospheric platform base station is moved by an air flow, phase synchronization can be performed.

In a mobile communication system according to the present invention, the stratospheric platform base station receives the radio wave transmitted from the ground radio base station, measures a super-frame length of the radio wave, compares the super-frame length with a standard super-frame length and adjusts a delay time extending from the reception of the radio wave to the transferring of the radio wave according to a comparison result.

Therefore, even though the stratospheric platform base station is moved by an air flow, phase synchronization can be performed.

In a mobile communication system according to the present invention, the stratospheric platform base station adjusts a delay time for each of radio waves transmitted from a plurality of ground radio base stations in cases where link channels are set between the stratospheric platform base station and the plurality of ground radio base stations.

Therefore, even though one link channel is disconnected by an accident or natural conditions, a lack of information can be prevented.

In a mobile communication system according to the present invention, the stratospheric platform base station receives a plurality of radio waves transmitted from a plurality of ground radio base stations, the stratospheric platform base station selects one of the radio waves, and the stratospheric platform base station transfers the selected radio wave to the subscriber station.

Therefore, the radio wave received under superior conditions can be transferred to the subscriber station.

In a mobile communication system according to the present invention, TDMA signals and time divided CDMA signals are included in time slots composing a frame to construct the information to be transmitted.

Therefore, a large number of pieces of high-speed data and pieces of low-speed data can be simultaneously transferred.

In a mobile communication system according to the present invention, one or more TDMA signals and one or more time divided CDMA signals are included in time slots, which are successively transferred along a time axis and are selected from a plurality of time slots composing a frame, to construct the information to be transmitted.

Therefore, a large number of pieces of high-speed data and pieces of low-speed data can be simultaneously transferred.

BRIEF DESCRIPTION OF THE DRAWINGS

FIG. 10 is an explanatory diagram showing a main portion of the stratospheric platform base station 7 of a mobile communication system according to the sixth embodiment of the present invention and FIG. 11 is an explanatory diagram showing an example of a time slot structure for a person communication system (PCS) and a cellular system according to the TDMA method and the Time Divided CDMA method.

DETAILED DESCRIPTION OF THE PREFERRED EMBODIMENTS

The invention will now be described with reference to the accompanying drawings.

EMBODIMENT 1

Figure 1:
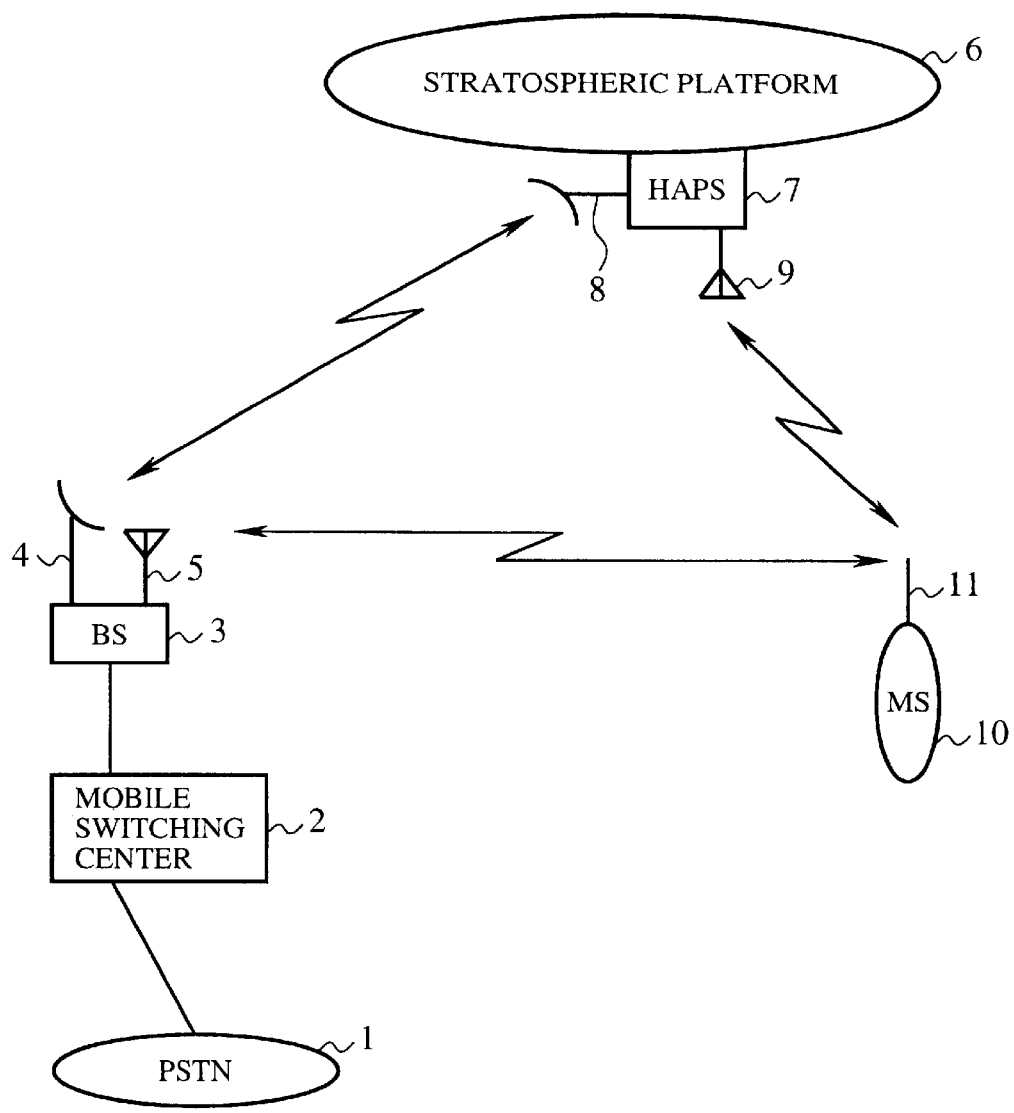
FIG. 1 is a constitutional diagram showing a mobile communication system according to a first embodiment of the present invention.

FIG. 1 is a constitutional diagram showing a mobile communication system according to a first embodiment of the present invention. In FIG. 1, 1 indicates a public switching telephone network (PSTN). 2 indicates a mobile switching center, wire-connected with the PSTN 1, for controlling a ground radio base station 3. 3 indicates the ground radio base station (BS), arranged on the ground, for performing a two-way communication of information with a stratospheric platform base station 7 and performing a two-way communication of information with a subscriber station 10. 4 indicates a directional antenna for performing a radio communication with the stratospheric platform base station 7. 5 indicates an antenna for performing a radio communication with the subscriber station 10.

6 indicates a stratospheric platform which is halted at an elevation of about 20 km from the ground (automatically halted at a prescribed position while using a power of propellers against a wind which is a low-density air flow)

and has a total length of about 200 m. The stratospheric platform 6 is made of a balloon on which a base station is mounted. 7 indicates the stratospheric platform base station (HAPS), set on the stratospheric platform 6, for performing a two-way communication of information with the ground radio base station 3 and performing a two-way communication of information with the subscriber station 10. 8 indicates a directional antenna for performing a radio-communication with the ground radio base station 3. 9 indicates an antenna for performing a radio-communication with the subscriber station 10.

10 indicates the subscriber station (MS) such as a fixed radio station, a semi-fixed radio station, a mobile station or a portable radio station. The subscriber station 10 performs a two-way communication of information with the ground radio base station 3 and performs a two-way communication of information with the stratospheric platform base station 7. 11 indicates an antenna for performing a radio-communication with the ground radio base station 3 or the stratospheric platform base station 7.

Figure 2:
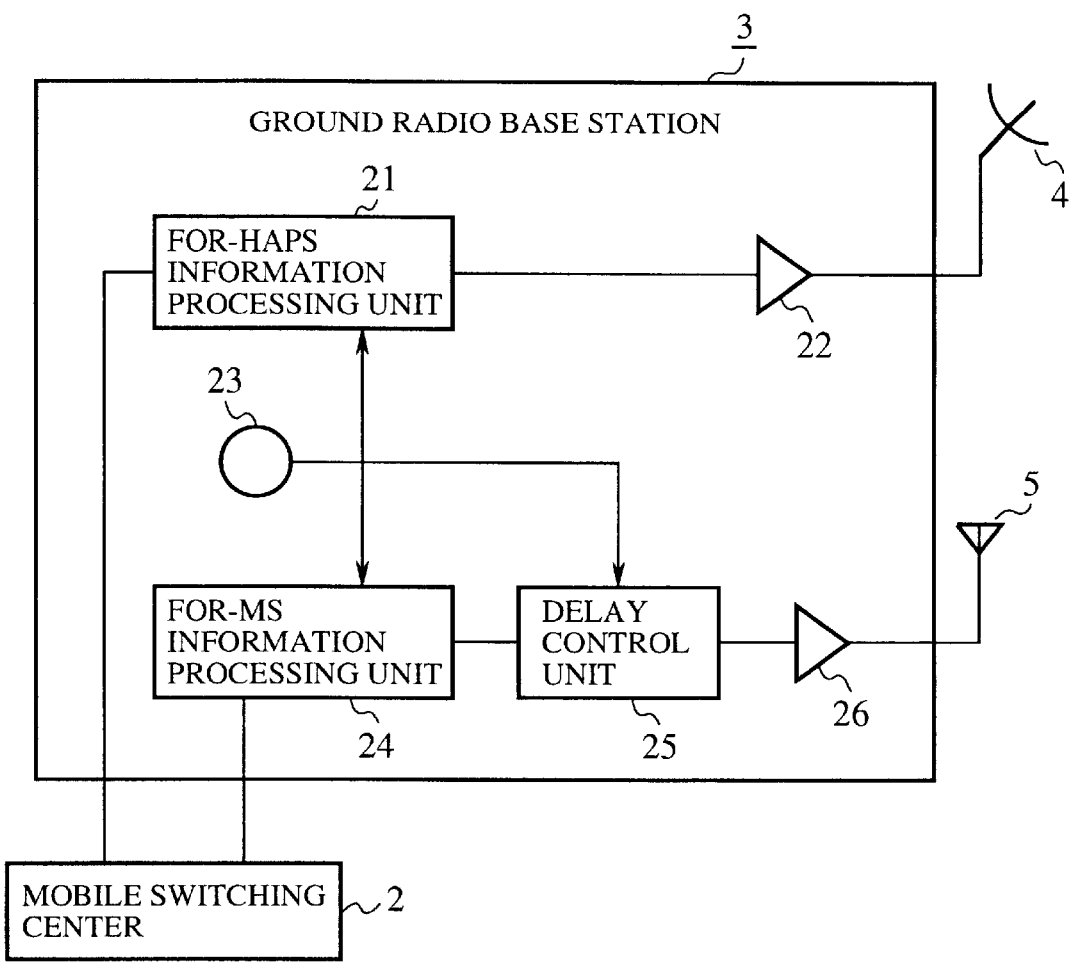
FIG. 2 is a constitutional diagram showing a main portion of a ground radio base station 3.

FIG. 2 is a constitutional diagram showing a main portion of the ground radio base station 3. In FIG. 2, 21 indicates a for-HASP information processing unit for receiving information transmitted from the mobile switching center 2 and performing a prescribed processing to transmit the information to the stratospheric platform base station 7. 22 indicates a transmitter for converting the information output from the for-HASP information processing unit 21 into radio wave and outputting the radio wave. 23 indicates a time setting unit for setting a delay time of the information. 24 indicates a for-MS information processing unit for receiving the same information as that received in the for-HASP information processing unit 21 and performing a prescribed processing to transmit the information to the subscriber station 10. 25 indicates a delay control unit for holding the information output from the for-MS information processing unit 24 by the delay time set in the time setting unit 23. 26 indicates a transmitter for converting the information output from the delay control unit 25 into radio wave and outputting the radio wave.

Next, an operation is described.

First, signals are transmitted or received between the subscriber station 10 and the stratospheric platform base station 7 or between the subscriber station 10 and the ground radio base station 3 by using a digital modulating method, and both the subscriber station 10 and the stratospheric platform base station 7 or both the subscriber station 10 and the ground radio base station 3 are connected with each other in radio communication according to a Frequency Division Multiple Access/Time Division Duplex (FDMA/TDD) method, a Code Division Multiple Access/Time Division Duplex (CDMA/TDD) method, a Multi-carriers Time Division Multiple Access/Frequency Division Duplex (TDMA/FDD) method, TDMA/TDD method, a Time Divided CDMA/FDD method or a Time Divided CDMA/TDD method.

Mobile communication systems using these methods are described in detail in the Patent Application PCT/JP97/02890 and the Patent Application PCT/JP97/03492 submitted by the present inventors. However, a mobile communication system, in which a case where a radio base station is arranged in a stratospheric platform is considered, is not described in the above submitted Patent Applications. Therefore, the mobile communication system is described in detail hereinafter.

Figure 3:
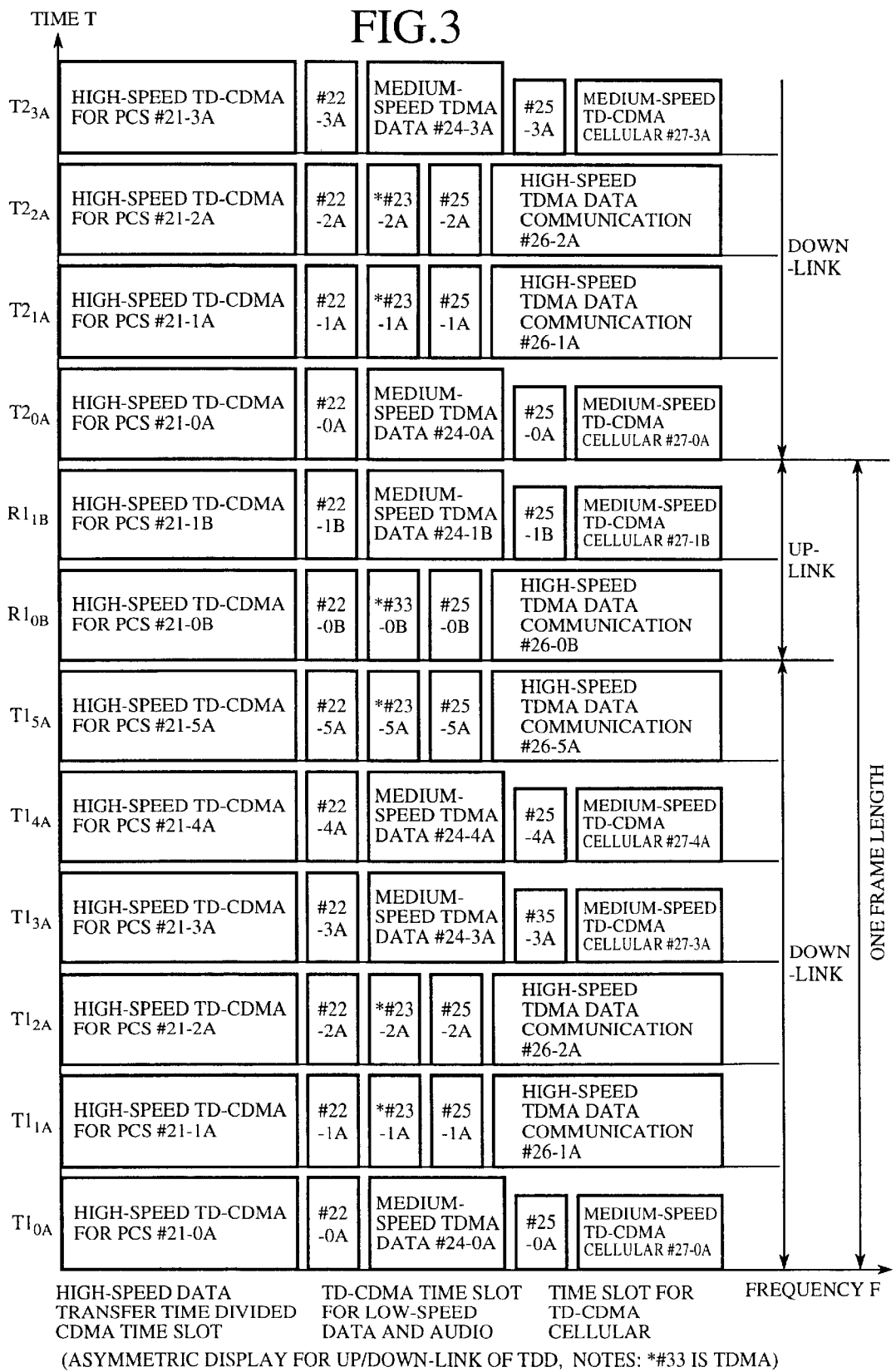
FIG. 3 is an explanatory diagram showing an example of a time slot structure for a person communication system (PCS) and a cellular system according to the TDMA method and the Time Divided CDMA method.

FIG. 3 shows an example of a time slot structure for a person communication system (PCS) and a cellular system according to the TDMA method and the Time Divided CDMA method.

Contents shown in FIG. 3 are briefly described. #21-0A to #21-5A, #21-0B and #21-1B indicate time divided CDMA time slots for the person communication system (PCS) high-speed data transfer in first and second frames.

22-0A to #22-5A, #22-0B and #22-1B indicate time divided CDMA time slots for the PCS low-speed data transfer in the first and second frames.

23-1A to #23-5A and #23-0B indicate TDMA time slots for the PCS low-speed data transfer in the first and second frames. #24-0A to #24-4A and #24-1B indicate TDMA time slots for the PCS middle-speed data transfer in the first and second frames.

26-1A to #26-5A and #26-0B indicate TDMA time slots for the PCS high-speed data transfer in the first and second frames.

25-0A to #25-5A, #25-0B and #25-1B indicate TDMA time slots for the cellular low-speed data transfer in the first and second frames. #27-0A to #27-4A and #27-1B indicate time divided CDMA time slots for the cellular high-speed data communication in the first and second frames.

FIG. 3 shows Up-Link and Down-Link of Time Division Duplex (TDD), the Up-Link corresponds to time slots expressed by $R1_{0B}$ and $R1_{1B}$ along a time axis, and Down-Link corresponds to time slots expressed by $T1_{0A}$ to $T1_{5A}$ and $T2_{0A}$ to $T2_{3A}$ along the time axis.

Here, the time slots $R1_{0B}$ and $R1_{1B}$ of the Up-Link and the time slots $T1_{0A}$ to $T1_{5A}$ of the Down-Link compose one frame, and the time slots $T2_{0A}$ to $T2_{3A}$ belong to a next frame. That is, FIG. 3 shows one frame and ½ of a following frame.

First, when information is transferred to the ground radio base station 3 from a station on the other end through the PSTN 1 and the mobile switching center 2, the information is converted into radio wave and is transmitted from the directional antenna 4 of the ground radio base station 3 to the stratospheric platform base station 7. Also, in the ground radio base station 3, the same information as the information is converted into radio wave and is transmitted from the antenna 5 to the subscriber station 10.

Thereafter, in the stratospheric platform base station 7, when the radio wave transmitted from the ground radio base station 3 is received in the directional antenna 8, the radio wave is transferred from the antenna 9 to the subscriber station 10.

Thereafter, in the subscriber station 10, the radio wave transmitted from the ground radio base station 3 is received in the antenna 11, and the radio wave transmitted from the stratospheric platform base station 7 is received in the antenna 11.

Figure 4:
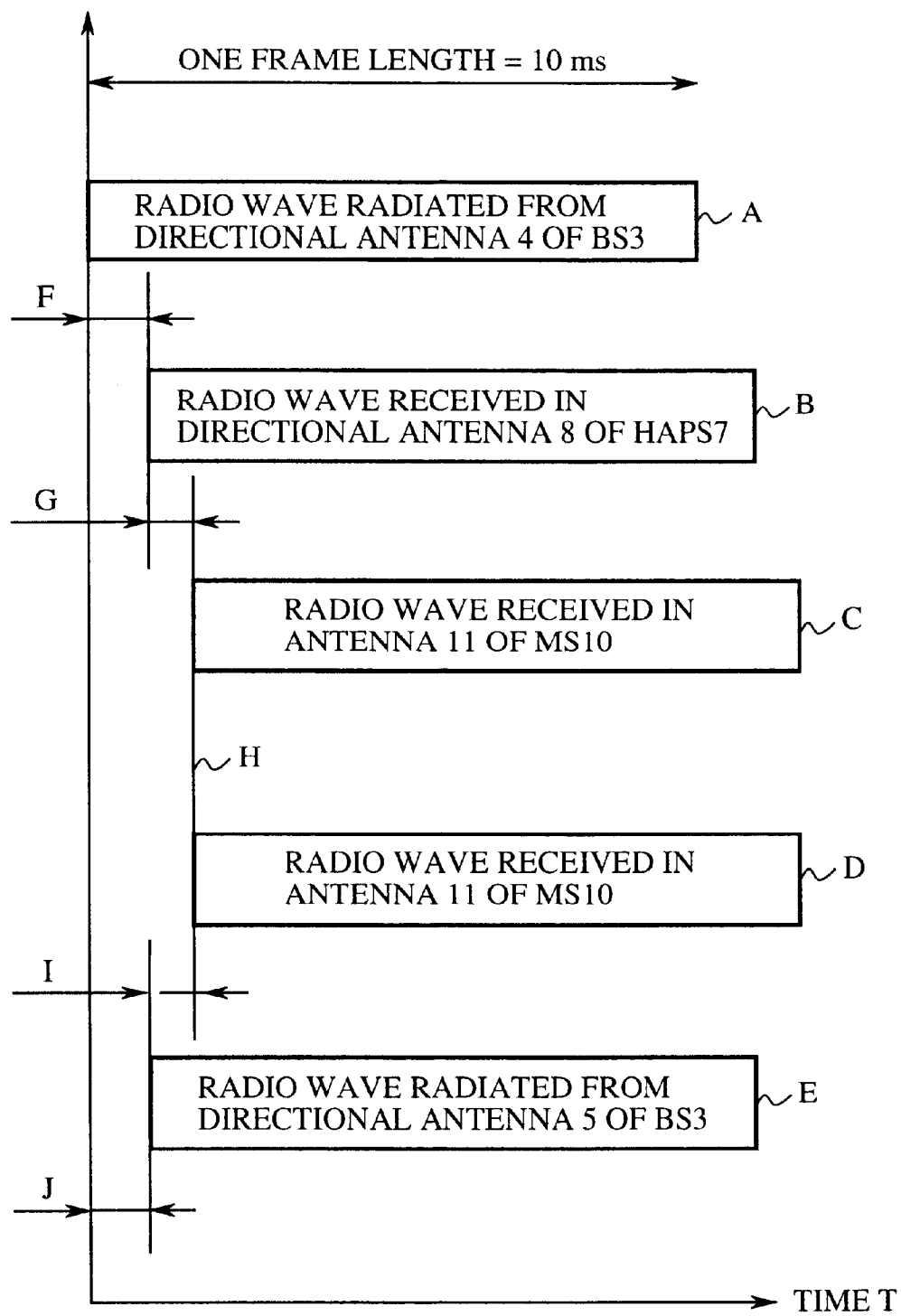
FIG. 4 is an explanatory diagram showing a delay time in information transfer of a down link which connect stations.

Here, FIG. 4 is an explanatory diagram showing a delay time in the information transfer of a down link which connects stations.

A time position just after the radiation of the radio wave from the directional antenna 4 of the ground radio base station 3 is indicated by A, and a time position, at which the radio wave is received in the directional antenna 8 of the stratospheric platform base station 7, is indicated by B.

Therefore, a delay time F indicates a propagation time in which the radio wave radiated from the directional antenna 4 of the ground radio base station 3 is received in the directional antenna 8 of the stratospheric platform base station 7.

In the mobile communication system having the stratospheric platform base station 7, because it is considered that an elevation of the stratospheric platform 6 is about 20 km, it is assumed that a distance in a straight line between the ground radio base station 3 and the stratospheric platform base station 7 is 30 km, and the delay time F; $30 \times 10^3/(3 \times 10^8) = 0.1 \times 10^{-3} = 0.1$ msec is obtained.

As a standard example, one frame length of 10 msec is shown in FIG. 4. This delay time F differs from a delay time of 200 msec in a case of the satellite communication and is on the order of 1% of one frame length. Therefore, the mobile communication system has a characteristic that the delay time F can be easily controlled. This characteristic is one reason that the introduction of the stratospheric platform base station 7 to the mobile communication system can be easily handled.

A time position C shown in FIG. 4 indicates a time position just after the radio wave, which is received in the directional antenna 8 of the stratospheric platform base station 7 at the time position B and is transmitted from the antenna 9 to the subscriber station 10, is received in the antenna 11 of the subscriber station 10.

Therefore, a delay time G indicates a summed time-period (a sum of a processing time-period in the stratospheric platform base station 7 and a propagation time-period) extending from a time of the reception of the radio wave in the stratospheric platform base station 7 to a time of the reception of the radio wave, which is transmitted from the stratospheric platform base station 7, in the subscriber station 10 through a signal processing in the stratospheric platform base station 7.

Also, because the radio wave transmitted from the antenna 5 of the ground radio base station 3 directly arrives at the antenna 11 of the subscriber station 10, a time position, at which the radio wave is received in the antenna 11 of the subscriber station 10, is indicated by D.

In this case, to radiate the radio wave from the ground radio base station 3 so as to make the radio wave arrive at the subscriber station 10 at the time position D, it is required to transmit the radio wave from the ground radio base station 3 at a time before the time position D. A time position, at which the radio wave is transmitted from the ground radio base station 3, is indicated by E.

A preparatory time-period, in which the radio wave transmitted from the ground radio base station 3 arrives at the subscriber station 10, is indicated by I.

As is described above, when a delay time J passes after the radiation of the radio wave from the ground radio base station 3 to the stratospheric platform base station 7, the radio wave is transmitted from the ground radio base station 3 to the subscriber station 10.

Hereinafter, a delay function for a transmission time in the ground radio base station 3 is described with reference to FIG. 2.

First, in the for-HAPS information processing unit 21 of the ground radio base station 3, when information to be transferred from the mobile switching center 2 to the subscriber station 10 is received, a prescribed processing is performed to transmit the information to the stratospheric platform base station 7.

Thereafter, in the transmitter 22, the information processed in the for-HAPS information processing unit 21 is converted into radio wave, and the radio wave is transmitted from the directional antenna 4 to the stratospheric platform base station 7.

Also, in the for-MS information processing unit 24 of the ground radio base station 3, when information (which is the same as the information transmitted from the mobile switching center 2 to the for-HAPS information processing unit 21) to be transferred from the mobile switching center 2 to the subscriber station 10 is received, a prescribed processing is performed to transmit the information to the subscriber station 10.

In the delay control unit 25, to synchronize the phase of the radio wave, which is directly received in the subscriber station 10 from the ground radio base station 3, with the phase of the radio wave which is received in the subscriber station 10 from the ground radio base station 3 through the stratospheric platform base station 7, the information output from the for-MS information processing unit 24 is temporarily held by a delay time (the delay time J shown in FIG. 4) set in the time setting unit 23. That is, when the delay time J passes after the outputting of the information processed in the for-MS information processing unit 24, the information is output to the transmitter 26.

Thereafter, in the transmitter 26, the information output from the delay control unit 25 is converted into radio wave, and the radio wave is transmitted from the antenna 5 to the subscriber station 10.

As is apparent in the above description, in the first embodiment, when the delay time J passes after the transmission of a radio wave to the stratospheric platform base station 7, another radio wave relating to the same information as that of the radio wave is transmitted to the subscriber station 10. Therefore, the phase of the radio wave, which is directly transmitted from the ground radio base station 3, is synchronized with the phase of the radio wave, which is transmitted from the ground radio base station 3 through the stratospheric platform base station 7, in the subscriber station 10. As a result, even though one of the radio waves is weakened, it is possible to hand over the other radio wave to the subscriber station 10.

EMBODIMENT 2

Figure 5:
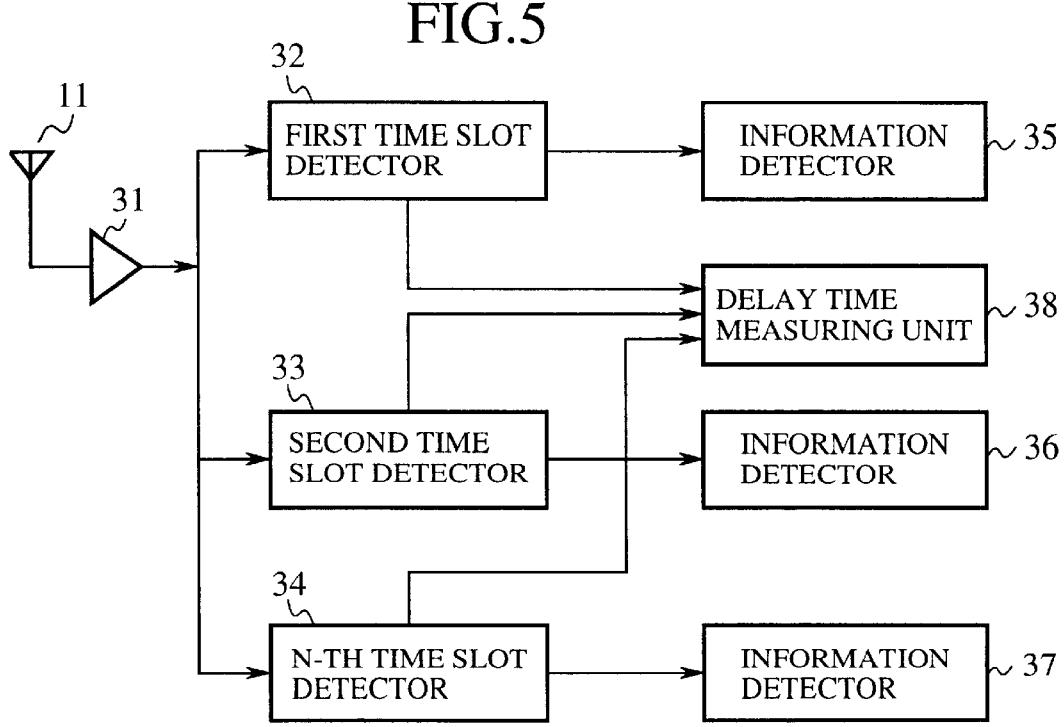
FIG. 5 is a constitutional diagram showing a main portion of a subscriber station 10 of a mobile communication system according to a second embodiment of the present invention.

FIG. 5 is a constitutional diagram showing a main portion of the subscriber station 10 of a mobile communication system according to a second embodiment of the present invention. In FIG. 5, 31 indicates an amplifier for amplifying the radio wave received in the antenna 11. 32 to 34 indicate a plurality of time slot detectors for respectively detecting time slots from the radio wave amplified in the amplifier 31. In the example shown in FIG. 5, a plurality of time slot detectors, of which the number is n, are prepared. 35 to 37 indicate a plurality of information detectors for respectively detecting information from the time slots detected in the corresponding time slot detector 32, 33 or 34, 38 indicates a delay time measuring unit for detecting a time difference (or a phase difference) between the time slots detected in the time slot detectors 32 to 34 and transmitting information of the phase difference to the delay control unit 25 of the ground radio base station 3.

Next, an operation is described.

In the first embodiment, the information output from the for-MS information processing unit 24 is temporarily held in the delay control unit 25 of the ground radio base station 3 by the delay time J set in the time setting unit 23 to synchronize the phases of the radio waves with each other in the subscriber station 10. However, in cases where the subscriber station 10 moves, the delay time J slightly changes with time to maintain the phase synchronization. Therefore, it is required to adjust the delay time J for the purpose of precisely maintaining the phase synchronization.

Therefore, in the second embodiment, the subscriber station 10 has a function for receiving the radio wave of each time slot, at which the radio wave transmitted from the ground radio base station 3 is directly received, simultaneously with the reception of the radio wave of the corresponding time slot at which the radio wave arrives through the stratospheric platform base station 7.

In detail, each time slot of the radio wave transmitted from the ground radio base station 3 is detected in the time slot detector 32. In cases where the corresponding time slot of the radio wave arriving through the stratospheric platform base station 7 is detected in the time slot detector 33, a phase difference between the time slots is detected in the delay time measuring unit 38. In the example shown in FIG. 6, a time slot L of the radio wave arriving through the stratospheric platform base station 7 is shifted in the forward direction by 3 time slots as compared with a time slot K of the radio wave directly transmitted from the ground radio base station 3.

Thereafter, when a phase difference between the time slots is detected in the delay time measuring unit 38, phase difference information, in which one symbol length is a minimum unit, is transmitted to the delay control unit 25 of the ground radio base station 3.

Figure 6:
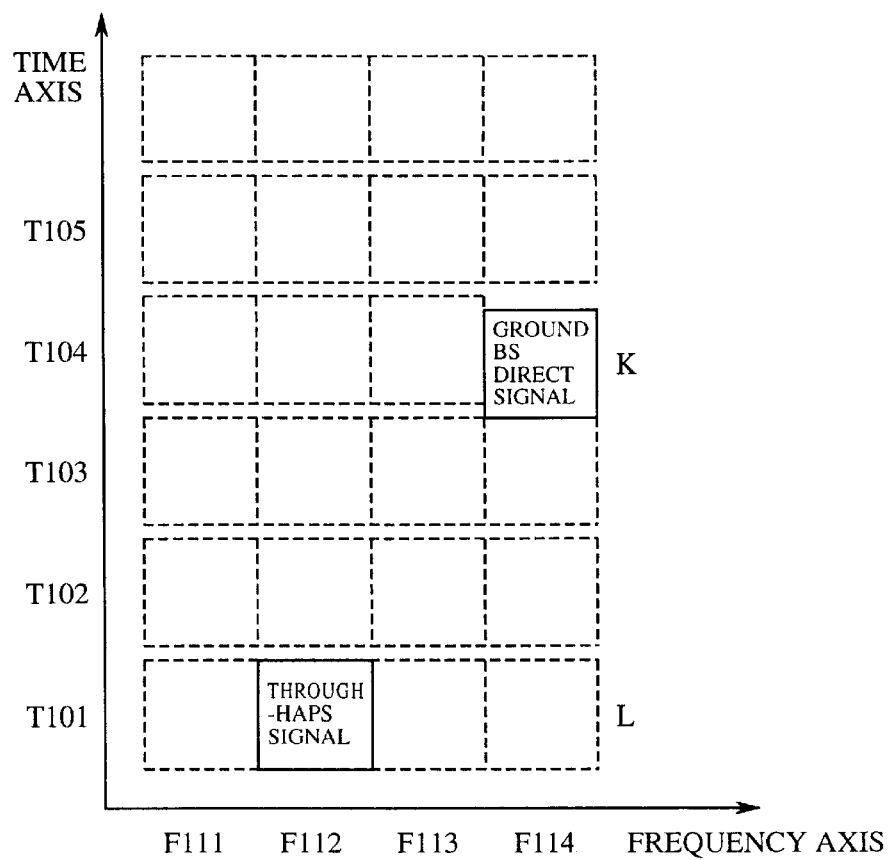
FIG. 6 is an explanatory diagram showing a phase synchronization of a time slot.

In cases where the phase difference information is measured in the delay time measuring unit 38, in FIG. 6, information of the arriving of a ground BS direct signal K at a frequency-time slot F114-T104 is sent in advance from the ground radio base station 3 to the subscriber station 10 through a control channel.

Therefore, because the ground BS direct signal K does not exactly arrive at the frequency-time slot F114-T104, as shown in FIG. 6, the ground BS direct signal K shifts slightly in the forward direction, and this time difference is measured as a phase difference to be measured (which is the same as the delay time J shown in FIG. 4). This time difference corresponds to the delay time J shown in FIG. 4. In FIG. 6, a through-HAPS signal L is placed in a time-slot T101, and the ground BS direct signal K is placed in a time-slot T104. Because a time slot difference between the time-slots T101 and T104 is set in advance, the time slot difference is not included in the delay time J to be measured.

As is described above, when the phase difference information transmitted from the delay time measuring unit 38 of the subscriber station 10 is received in the delay control unit 25 of the ground radio base station 3, the delay time J set in the time setting unit 23 is adjusted according to the phase difference information. Therefore, the phase synchronization between the radio waves can be precisely maintained.

As is apparent in the above description, in the second embodiment, the phase of the radio wave transmitted from the ground radio base station 3 is compared, in the subscriber station 10, with the phase of the radio wave transmitted from the stratospheric platform base station 7, and the phase difference information is transmitted to the ground radio base station 3. Accordingly, the phase synchronization can be precisely maintained, and communication turbulence in the hand-over operation can be suppressed.

Here, in cases where it is required to minutely maintain the phase synchronization, it is preferable that phase difference information, in which one chip rate length is a minimum unit, be transmitted to the ground radio base station 3.

EMBODIMENT 3

In the second embodiment, the subscriber station 10 has one delay time measuring unit 38 (or one phase detecting unit), and the phase difference information is transmitted to the ground radio base station 3. However, in cases where a subscriber station can perform an information communication not only with one set of the ground radio base station 3 and the stratospheric platform base station 7 but also with a set of a plurality of ground radio base stations 3 and the stratospheric platform base station 7, it is applicable that a plurality of delay time measuring units 38 be arranged in the subscriber station 10 to transmit pieces of phase difference information to the plurality of ground radio base stations 3.

Therefore, even though the subscriber station 10 moves to a zone of an adjacent ground radio base station 3 during the communication, communication turbulence can be suppressed. That is, the subscriber station 10 can hand over phase difference information to another ground radio base station 3 without a lack of information.

EMBODIMENT 4

In the second embodiment, the phase difference between the radio waves is detected in the subscriber station 10, and the phase difference information is transmitted to the ground radio base station 3. However, it is preferable that the phase difference between the radio waves be detected in the ground radio base station 3 to adjust the delay time J.

Figure 7:
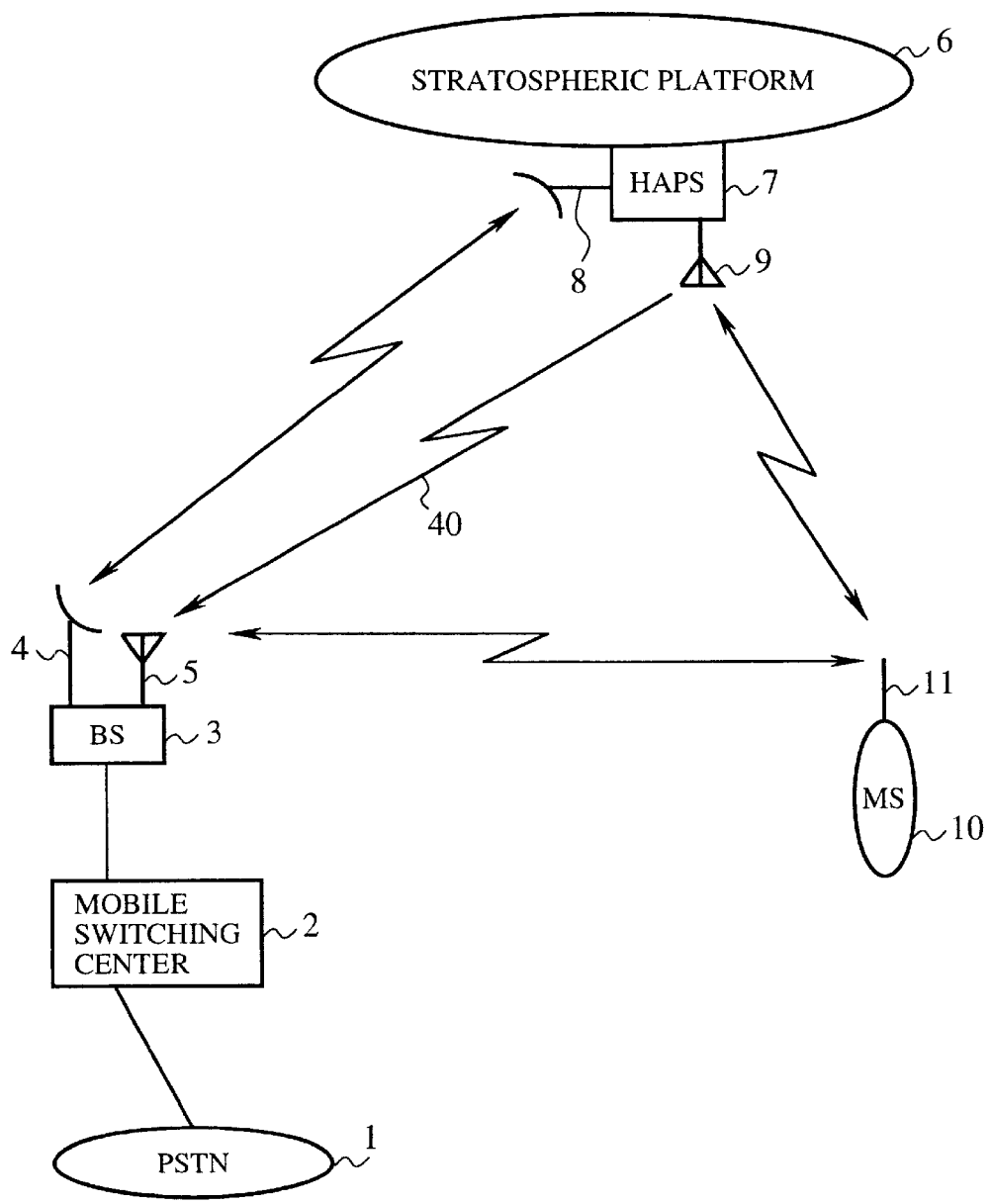
FIG. 7 is a constitutional diagram showing a mobile communication system according to a fourth embodiment of the present invention.

In detail, a plurality of time slot detectors and a delay time measuring unit are arranged in the ground radio base station 3 in the same manner as in the subscriber station 10 shown in FIG. 5, and a link 40 is newly added between the stratospheric platform base station 7 and the ground radio base station 3 (refer to FIG. 7).

Thereafter, a time slot of the radio wave (which is transmitted from the ground radio base station 3 to the stratospheric platform base station 7 and is returned from the stratospheric platform base station 7) returned from the stratospheric platform base station 7 is detected in one time slot detector of the ground radio base station 3. When a time slot of the radio wave transmitted from the ground radio base station 3 to the subscriber station 10 is detected in the other time slot detector of the ground radio base station 3, a phase difference between the time slots is detected in the delay time measuring unit 38 of the ground radio base station 3.

In this case, a propagation time between the ground radio base station 3 and the stratospheric platform base station 7 is considered for the radio wave returned from the stratospheric platform base station 7. However, a propagation time between the ground radio base station 3 and the subscriber station 10 is not considered for the radio wave transmitted from the ground radio base station 3 to the subscriber station 10. Therefore, in cases where a phase difference between the time slots is detected, a prescribed delay time is added to the phase of the radio wave (which is transmitted from the ground radio base station 3 to the subscriber station 10) detected in the other time slot detector, and a phase difference between the time slots is detected.

Thereafter, in the delay control unit 25 of the ground radio base station 3, the delay time J set in the time setting unit 23 is adjusted according to the phase difference detected in the delay time measuring unit 38, and the phase synchronization between the radio waves is precisely maintained.

As is apparent in the above description, in the fourth embodiment, the phase of the radio wave returned from the stratospheric platform base station 7 is compared, in the ground radio base station 3, with the phase of the radio wave transmitted to the subscriber station 10, and the delay time J is adjusted according to the comparison result. Accordingly, the phase synchronization can be precisely maintained, and communication turbulence in the hand-over operation can be suppressed.

Here, in cases where it is required to minutely maintain the phase synchronization, it is preferable that the delay time J be adjusted according to a comparison result of phases in which one chip rate length is a minimum unit.

EMBODIMENT 5

Figure 8:
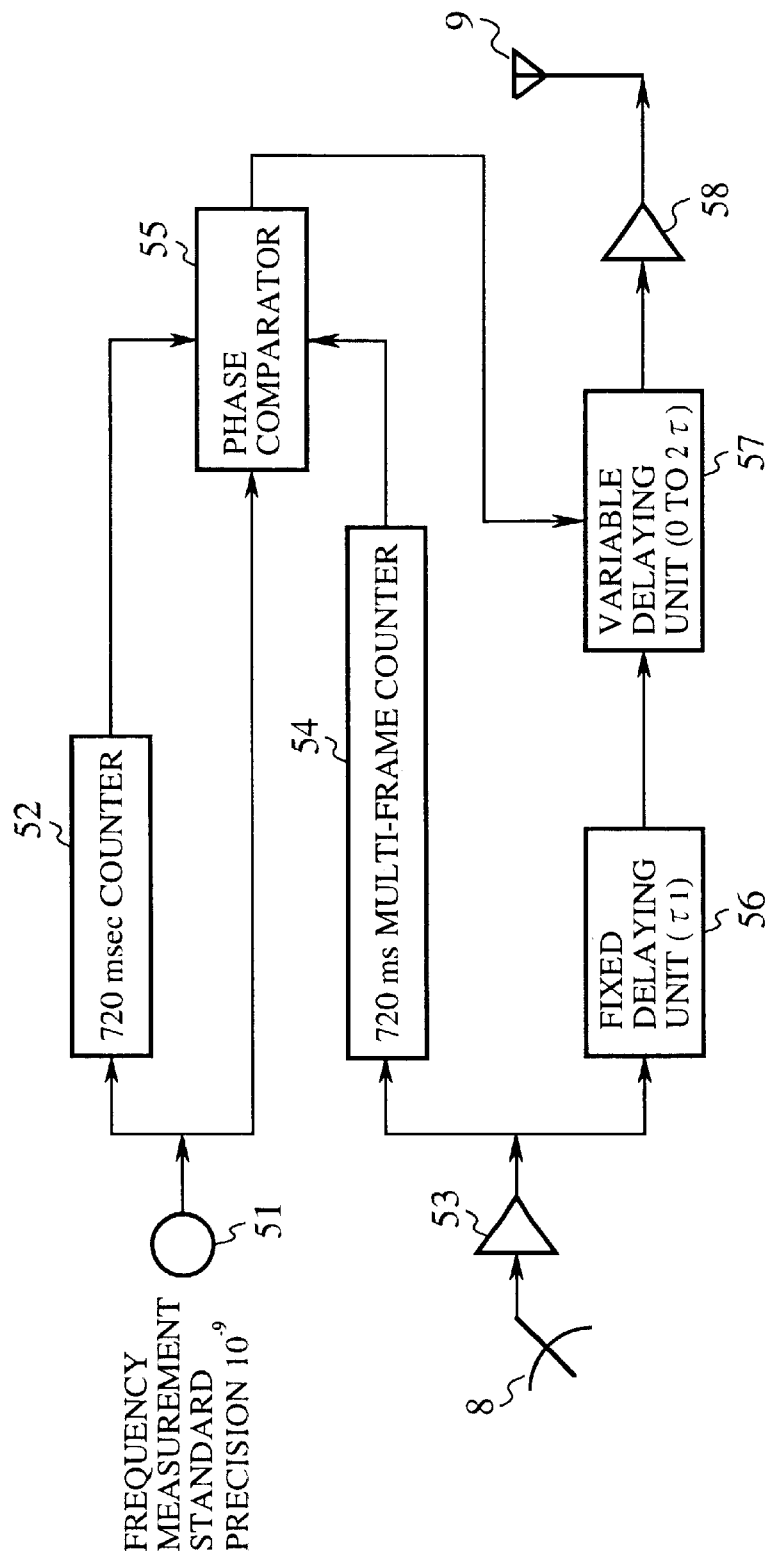
FIG. 8 is an explanatory diagram showing a main portion of a stratospheric platform base station 7 of a mobile communication system according to a fifth embodiment of the present invention.

FIG. 8 is an explanatory diagram showing a main portion of the stratospheric platform base station 7 of a mobile communication system according to a fifth embodiment of the present invention. In FIG. 8, 51 indicates a frequency measurement standard having a precision on the order of $10^{-9}$. 52 indicates a 720 msec counter for measuring a standard multi-frame length in synchronization with a standard frequency of the frequency measurement standard 51. 53 indicates a receiver for receiving the radio wave transmitted from the ground radio base station 3. 54 indicates a 720 ms multi-frame counter for measuring a length of 720 msec and detecting a multi-frame length from the radio wave received in the receiver 53.

55 indicates a phase comparator for comparing the multi-frame length detected in the 720 ms multi-frame counter 54 and the standard multi-frame length measured in the 720 msec counter 52, instructing a variable delaying unit 57 to shorten a delay time, in cases where the multi-frame length is longer than the standard multi-frame length, and instructing the variable delaying unit 57 to lengthen a delay time in cases where the multi-frame length is shorter than the standard multi-frame length. 56 indicates a fixed delaying unit for holding the radio wave received in the receiver 53 by a pre-set fixed delay time. 57 indicates the variable delaying unit for holding the radio wave received in the receiver 53 by a variable delay time set under the instruction of the phase comparator 55. 58 indicates a transmitter for transmitting the radio wave output from the variable delaying unit 57 to the subscriber station 10.

Next, an operation is described.

Though the stratospheric platform 6 is moved by air flow (or wind), the stratospheric platform 6 is controlled by propellers to be returned to an original point.

However, because the control of the stratospheric platform 6 depends on wind strength, inertia of the stratospheric platform 6 and control performance of the stratospheric platform 6, the stratospheric platform 6 is placed within a limited area (for example, within 3 km).

For example, in cases where the stratospheric platform 6 floating at an elevation of 20 km is placed at a distance of 30 km (30±3 km) from the ground radio base station 3, a movable distance of 3 km is equivalent to 10 $\mu$m by converting the distance into time according to a radio wave speed. In case of a data transfer rate of 2 Mbps, because one symbol length is 1 $\mu$s in the quadrature phase shift keying method, the position change of the stratospheric platform 6 is equivalent to ±10 symbol lengths.

In general, because a guard time between a channel and a time slot in the TDMA method is 2 or 3 symbol lengths, it is assumed that the control at the precision of one symbol length is sufficient for practical use to control the change of the symbol length. Also, in cases where a maximum speed of the wind is 60 m/s, because it takes 5 seconds to move the stratospheric platform 6 by a distance of 300 m equivalent to one symbol length of 1 $\mu$s, it is sufficient that a correction control for the delay change is performed once a second.

For example, because one super-frame length according to the TDD method of IMT-2000 is 720 msec, it is possible that the correction control is performed every 720 msec.

Hereinafter, a correction control for the delay change is described with reference to FIG. 8.

First, in the 720 msec counter 52, a standard multi-frame length is measured in synchronization with a standard frequency of the frequency measurement standard 51.

Also, in the 720 ms multi-frame counter 54, a multi-frame length is detected from the radio wave received in the receiver 53.

Thereafter, in the phase comparator 55, the multi-frame length detected in the 720 ms multi-frame counter 54 is compared with the standard multi-frame length measured in the 720 msec counter 52.

In cases where the multi-frame length corresponding to the received radio wave is longer than the standard multi-frame length, the variable delaying unit 57 is instructed to shorten a delay time. In contrast, in cases where the multi-frame length corresponding to the received radio wave is shorter than the standard multi-frame length, the variable delaying unit 57 is instructed to lengthen a delay time.

Therefore, after the radio wave received in the receiver 53 is held in the fixed delaying unit 56 by a pre-set fixed delay time, the radio wave received in the receiver 53 is held in the variable delaying unit 57 by a variable delay time (the delay time set in the phase comparator 55), and the radio wave is transmitted from the transmitter 58 to the subscriber station 10.

Here, in cases where 3 km denoting the maximum moving distance of the stratospheric platform 6 is converted into a time-length of light, this time-length is 10 $\mu$s. Therefore, the delay time in the fixed delaying unit 56 and the delay time in the variable delaying unit 57 can cover the delay adjustment for the radio wave.

As is apparent in the above description, in the fifth embodiment, when the radio wave transmitted from the ground radio base station 3 is received in the stratospheric platform base station 7, the frame length of the radio wave is measured and is compared with the standard frame length, and a delay time extending from the reception of the radio wave to the transferring of the radio wave is adjusted according to the comparison result. Therefore, even though the stratospheric platform base station 7 is moved by air flow, the phase synchronization can be maintained.

Here, in the fifth embodiment, the frame length of the radio wave is measured and is compared with the standard frame length. However, it is applicable that a multi-frame length of the radio wave be measured and be compared with a standard multi-frame length, and the same effect can be obtained.

Also, it is applicable that a super-frame length of the radio wave be measured and be compared with a standard super-frame length, and the same effect can be obtained.

EMBODIMENT 6

Figure 9:
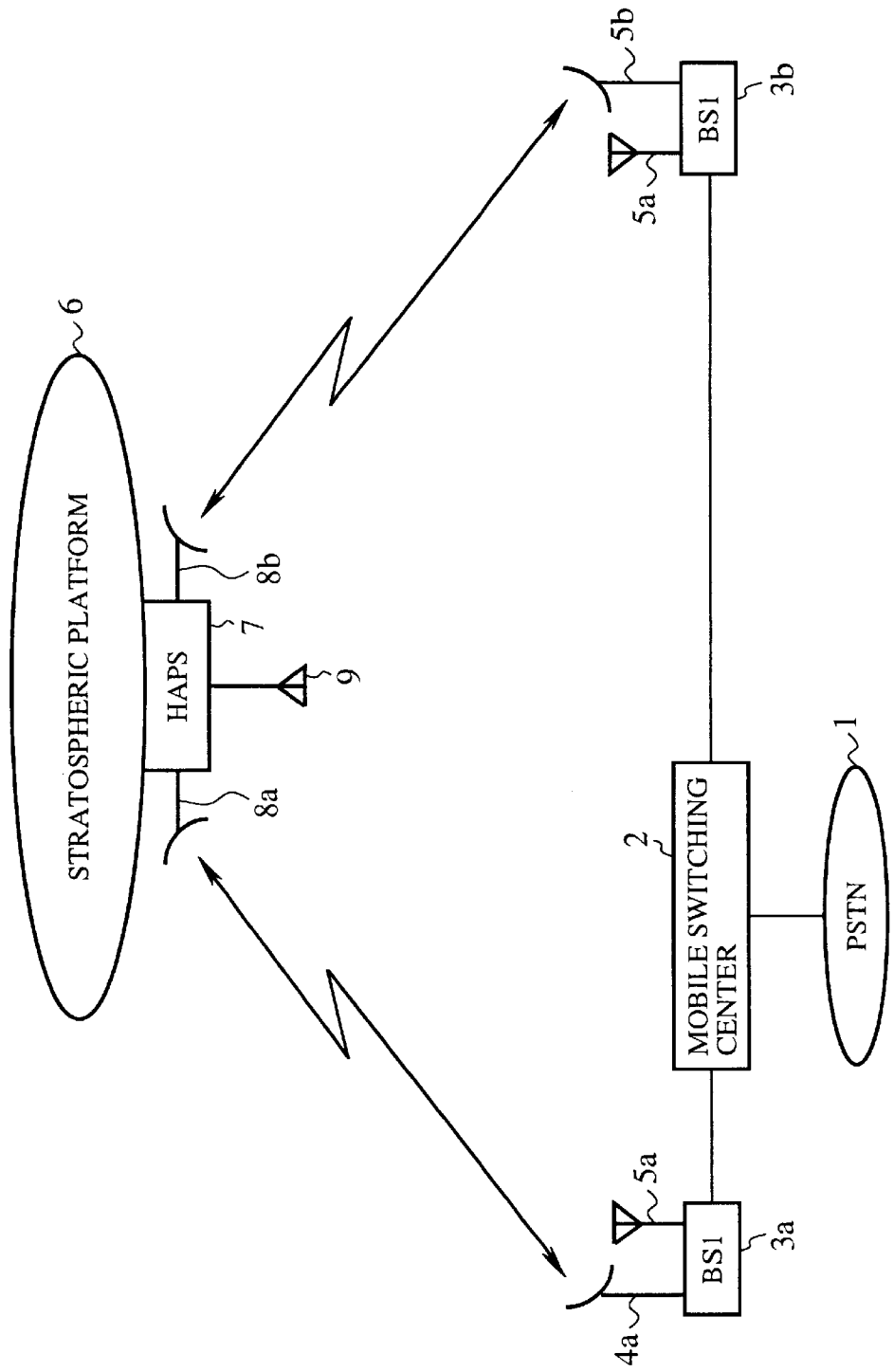
FIG. 9 is a constitutional diagram showing a mobile communication system according to a sixth embodiment of the present invention.

FIG. 9 is a constitutional diagram showing a mobile communication system according to a sixth embodiment of the present invention. In FIG. 9, constituent elements, which are indicated by the same reference numbers as those of FIG. 1, are the same as or equivalent to those of FIG. 1, and the description of the constituent elements is omitted.

3a and 3b indicate a plurality of ground radio base stations which are the same as the ground radio base station 3. 4a and 4b indicate a plurality of directional antennas which are the same as the directional antenna 4. 5a and 5b indicate a plurality of antennas which are the same as the antenna 5.

Figure 10:
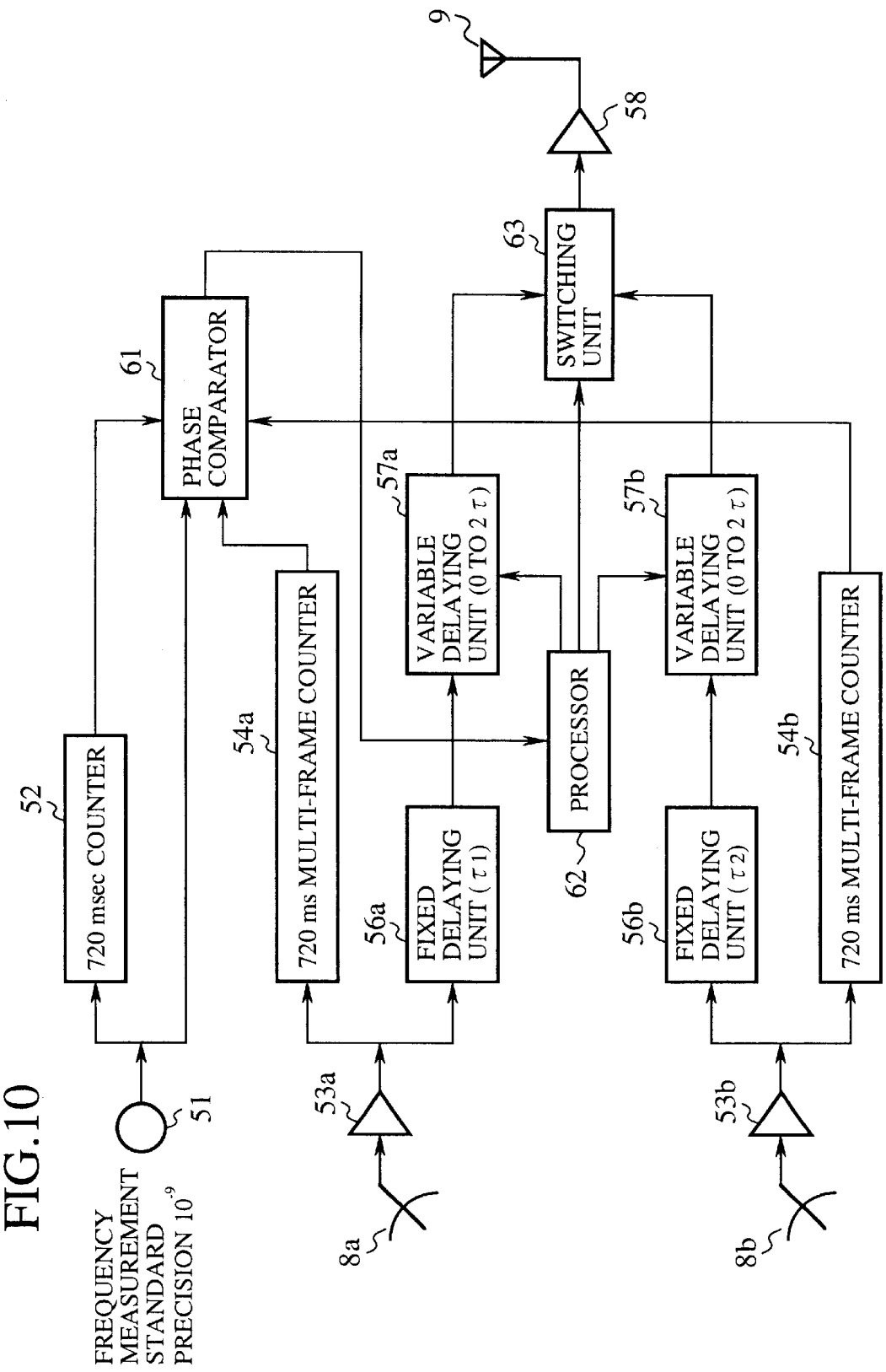

FIG. 10 is an explanatory diagram showing a main portion of the stratospheric platform base station 7 of the mobile communication system according to the sixth embodiment of the present invention. In FIG. 10, constituent elements, which are indicated by the same reference numbers as those of FIG. 8, are the same as or equivalent to those of FIG. 8, and the description of the constituent elements is omitted.

53a and 53b indicate a plurality of receivers which are the same as the receiver 53. 54a and 54b indicate a plurality of 720 ms multi-frame counters which are the same as the 720 ms multi-frame counter 54. 56a and 56b indicate a plurality of fixed delaying units which are the same as the fixed delaying unit 56. 57a and 57b indicate a plurality of variable delaying units which are the same as the variable delaying unit 57.

61 indicates a phase comparator for comparing the multi-frame length detected in the 720 ms multi-frame counter 54a and the standard multi-frame length measured in the 720 msec counter 52, comparing the multi-frame length detected in the 720 ms multi-frame counter 54b and the standard multi-frame length measured in the 720 msec counter 52 and informing a processor 62 of those comparison results. 62 indicates the processor for controlling a delay time in the variable delaying unit 57a and a delay time in the variable delaying unit 57b according to the comparison results of the phase comparator 61 and controlling a switching selection of a switching unit 63. 63 indicates the switching unit for selecting the radio wave output from the variable delaying unit 57a or selecting the radio wave output from the variable delaying unit 57b.

Next, an operation is described.

In the first embodiment, a two-way communication is performed between the stratospheric platform base station 7 and the ground radio base station 3 in one-to-one correspondence. However, it is applicable that a two-way communication be performed between the stratospheric platform base station 7 and the plurality of ground radio base stations 3a and 3b.

However, in cases where a two-way communication is performed between the stratospheric platform base station 7 and the plurality of ground radio base stations 3a and 3b, the stratospheric platform 6 is not necessarily placed at a middle point of the plurality of ground radio base stations 3a and 3b. Therefore, a delay time between the ground radio base station 3a and the stratospheric platform 6 differs from a delay time between the ground radio base station 3b and the stratospheric platform 6.

However, it is assumed that the mobile switching center 2 is controlled to make the ground radio base stations 3a and 3b simultaneously receive system synchronizing signals output from the mobile switching center 2, it can be regarded that the system synchronizing signal to be output from the directional antenna 4a and the system synchronizing signal to be output from the directional antenna 4b are simultaneously radiated.

As is described above, in cases where the system synchronizing signals are simultaneously radiated from the ground radio base stations 3a and 3b, because a distance between the ground radio base station 3a and the stratospheric platform 6 differs from a distance between the ground radio base station 3b and the stratospheric platform 6, a delay time in both the fixed delaying unit 56a and the variable delaying unit 57a differs from a delay time in both the fixed delaying unit 56b and the variable delaying unit 57b.

In cases where a position of the stratospheric platform 6 is once determined, delay times τ1 and τ2 in the fixed delaying units 56a and 56b are fixed.

In the above states, in cases where the position of the stratospheric platform 6 is moved, a phase change caused by the movement of the stratospheric platform 6 is absorbed in the variable delaying units 57a and 57b (in the fifth embodiment, the phase comparator 55 directly controls the variable delaying unit 57. However, the sixth embodiment differs from the fifth embodiment in a point that the processor 62, which receives the comparison results from the phase comparator 61, controls the variable delaying units 57a and 57b. However, the control in the sixth embodiment is substantially the same as that in the fifth embodiment).

Therefore, because the phase of the radio wave transmitted from the ground radio base station 3a is synchronized with the phase of the radio wave transmitted from the ground radio base station 3b on an input end of the switching unit 63, it is allowed that any of the radio waves is transmitted to the subscriber station 10. However, to transmit one radio wave of which the signal strength is high, in cases where the signal strength of one radio wave currently selected is higher than a reference value, the radio wave is still selected and is transmitted. However, in cases where the signal strength of one radio wave currently selected is lower than a reference value, the other radio wave is selected and is transmitted. However, in cases where the signal strength of the other radio wave is lower than the signal strength of one radio wave currently selected, the other radio wave is not selected, and the radio wave currently selected is transmitted.

As is apparent in the above description, in the sixth embodiment, in cases where a link channel is set between the stratospheric platform base station 7 and each of the plurality of ground radio base stations 3a and 3b, the delay time is adjusted for each of the radio waves transmitted from the ground radio base stations 3a and 3b. Accordingly, even though one link channel is, for example, disconnected because of an accident or natural conditions, a lack of information can be prevented.

EMBODIMENT 7

In the first embodiment, as shown in FIG. 3, the TDMA signals and the time divided CDMA signals are included in the time slots composing each frame in the ground radio base station 3, and pieces of information to be transmitted are constructed. However, as shown in FIG. 11, it is applicable that one or more TDMA signals and one or more time divided CDMA signals be included, in the ground radio base station 3, in a plurality of time slots (refer to #21-0A to #21-4A, #20-5A, #21-0B and #21-1B), which are successively transmitted along the time axis and are selected from all time slots composing each frame, to construct pieces of information to be transmitted.

In the above both cases, a large number of pieces of high-speed data and pieces of low-speed data can be simultaneously transmitted.

As is described above, in cases where a radio communication is performed between a ground radio base station and a subscriber station, when the strength of one radio wave is weakened, the mobile communication system according to the present invention is appropriate to a case where another radio wave is handed over to the subscriber station.

What is claimed is:

1. A mobile communication system, comprising:
   a ground radio base station for converting information transmitted from a mobile switching center into a radio wave and transmitting the radio wave;
   a stratospheric platform base station for receiving the radio wave transmitted from the ground radio base station and transferring the information included in the radio wave; and a subscriber station for receiving both the radio wave transmitted from the ground radio base station and the radio wave transferred from the stratospheric platform base station, wherein the ground radio base station transmits another radio wave relating to the same information as that of the radio wave to the subscriber station when a prescribed delay time passes after the transmission of the radio wave from the ground radio base station to the stratospheric platform base station.

2. A mobile communication system according to claim 1, wherein the ground radio base station receives phase difference information from the subscriber station and adjusts the prescribed delay time in cases where the subscriber station compares a phase of the radio wave transmitted from the ground radio base station with a phase of the radio wave transmitted from the stratospheric platform base station and transmits the phase difference information.

3. A mobile communication system according to claim 2, wherein the subscriber station has a plurality of phase detectors for respectively detecting phase difference information and transmits the pieces of phase difference information to a plurality of ground radio base stations.

4. A mobile communication system according to claim 2, wherein the subscriber station transmits the phase difference information in which one symbol length is a minimum unit.

5. A mobile communication system according to claim 2, wherein the subscriber station transmits the phase difference information in which one chip rate length is a minimum unit.

6. A mobile communication system according to claim 1, wherein the ground radio base station compares a phase of the radio wave transmitted from the stratospheric platform base station with a phase of the radio wave transmitted to the subscriber station and adjusts the prescribed delay time according to a comparison result.

7. A mobile communication system according to claim 6, wherein the ground radio base station adjusts the prescribed delay time according to the comparison result in which one symbol length is a minimum unit.

8. A mobile communication system according to claim 6, wherein the ground radio base station adjusts the prescribed delay time according to the comparison result in which one chip rate length is a minimum unit.

9. A mobile communication system according to claim 1, wherein the stratospheric platform base station receives the radio wave transmitted from the ground radio base station, measures a frame length of the radio wave, compares the frame length with a standard frame length and adjust a delay time extending from the reception of the radio wave to the transferring of the radio wave according to a comparison result.

10. A mobile communication system according to claim 9, wherein the stratospheric platform base station adjusts a delay time for each of radio waves transmitted from a plurality of ground radio base stations in cases where link channels are set between the stratospheric platform base station and the plurality of ground radio base stations.

11. A mobile communication system according to claim 10, wherein the stratospheric platform base station receives a plurality of radio waves transmitted from a plurality of ground radio base stations, the stratospheric platform base station selects one of the radio waves, and the stratospheric platform base station transfers the selected radio wave to the subscriber station.

12. A mobile communication system according to claim 1, wherein the stratospheric platform base station receives the radio wave transmitted from the ground radio base station, measures a multi-frame length of the radio wave, compares the multi-frame length with a standard multi-frame length and adjust a delay time extending from the reception of the radio wave to the transferring of the radio wave according to a comparison result.

13. A mobile communication system according to claim 1, wherein the stratospheric platform base station receives the radio wave transmitted from the ground radio base station, measures a super-frame length of the radio wave, compares the super-frame length with a standard super-frame length and adjust a delay time extending from the reception of the radio wave to the transferring of the radio wave according to a comparison result.

14. A mobile communication system according to claim 1, wherein the ground radio base station makes time slots composing a frame include TDMA signals and time divided CDMA signals to construct the information to be transmitted.

15. A mobile communication system according to claim 1, wherein the ground radio base station makes time slots, which are successively transferred along a time axis and are selected from a plurality of time slots composing a frame, include one or more TDMA signals and one or more time divided CDMA signals to construct the information to be transmitted.

* * * * *